United States Patent

[11] 3,577,992

[72] Inventors Jack D. Merry
Minnetonka, Minn.;
Fritz Deuschle, St. Louis, Mo.
[21] Appl. No. 664,716
[22] Filed Aug. 31, 1967
[45] Patented May 11, 1971
[73] Assignee Brunswick Corporation

[54] VALVE FOR USE WITH A CONDUIT HAVING A LUMEN
7 Claims, 4 Drawing Figs.
[52] U.S. Cl. ................................................. 128/349, 251/145
[51] Int. Cl. ........................................................ A61m 25/00
[50] Field of Search........................................... 128/348–351, 344, 246, 325; 137/615, 798, 318; 251/145, 146, 148

[56] References Cited
UNITED STATES PATENTS
3,477,438 11/1969 Allen et al. ................... 128/349
1,006,108 10/1911 Lundberg...................... 251/146
2,173,527 9/1939 Agayoff........................ 128/349
2,896,629 7/1959 Warr............................. 128/349
2,912,981 11/1959 Keough ........................ 128/349
3,356,093 12/1967 Monohon...................... 128/349
3,385,301 5/1968 Harautuneian............... 128/349
3,409,015 11/1968 Swanson....................... 128/349

FOREIGN PATENTS
1,078,650 9/1967 Great Britain................ 128/349B.V.

Primary Examiner—Dalton L. Truluck
Attorney—Hofgren, Wegner, Allen, Stellman and McCord ABSTRACT: A valve adapter for use with a tubular conduit, such as an inflation-type catheter, having a lumen in the wall thereof. The adapter is arranged to receive the tapered end of a fluid flow duct, such as a hypodermic needle for conducting pumped air through the inflation lumen. The catheter is provided at its inner end with a balloon structure which is enlarged by the air pumped through the lumen to retain the catheter in a body cavity.

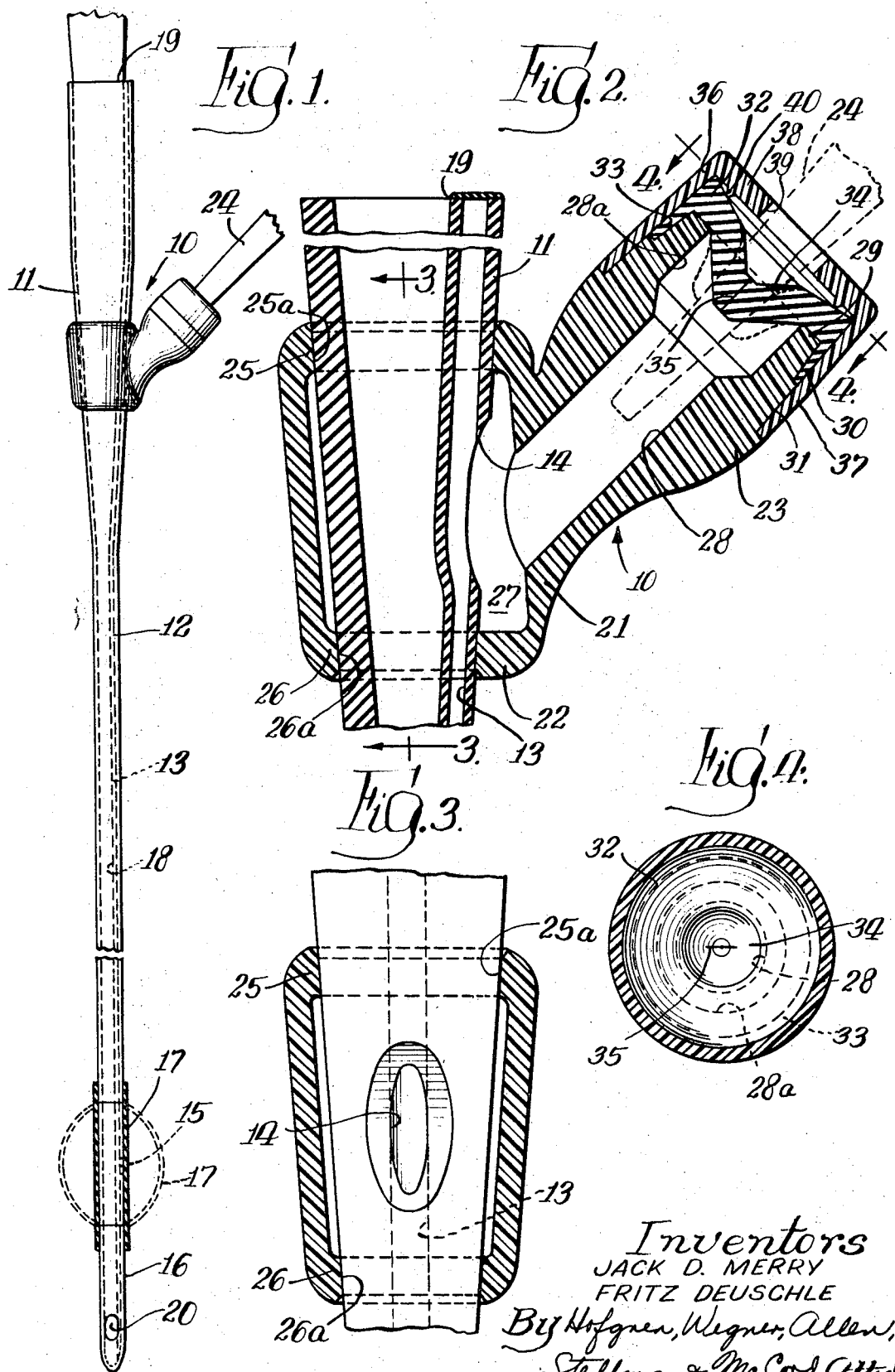

VALVE FOR USE WITH A CONDUIT HAVING A LUMEN

This invention relates to a valve structure and in particular to a structure for receiving a tapered flow duct for transferring fluid relative thereto.

In one form of a tubular conduit comprising a catheter, an inflation lumen is provided in the wall thereof to extend longitudinally from an outer end portion of the catheter conduit to an inner end portion thereof. A balloon is sealingly secured to the inner end to receive pressurized air from the lumen, to be expanded by the air, and to thereby retain the inner end of the catheter within a body cavity against accidental displacement therefrom. A number of devices have been employed for delivering the balloon-expanding air into the lumen at the outer end of the catheter. The known valve structures for effecting such delivery have had a number of serious disadvantages. One such disadvantage is the inability of the known valve structures to be used interchangeably on different size catheters. Another disadvantage is the failure of such known valve structures to provide an effective seal to the catheter tube. Yet another disadvantage is the requirement for accurately locating the valve structure on the catheter relative to the inlet opening of the inflation lumen. Still another disadvantage is the liability of the known valve structures to permit undesirable deflation as by accidental squeezing deformation of the valve structure. A further disadvantage is the difficulty of maintaining the flow duct end firmly seated in the valve. A yet further disadvantage is the provision of such valve structures with a relatively flat membranelike penetrating portion having a tendency to expel a tapered flow duct such as a syringe needle. The present invention comprehends a new and improved structure eliminating the above discussed disadvantages of the known valve structures in a novel and simple manner.

Thus, a principal feature of the present invention is the provision of a new and improved valve structure.

Another feature of the invention is the provision of a new and improved valve structure for use with a tubular conduit such as an inflation catheter.

A further feature of the invention is the provision of such a valve structure which is adapted for mounting interchangeably on a plurality of different size catheters.

A yet further feature of the invention is the provision of such a valve structure having a new and improved means for obtaining a tight seal with the catheter tube.

A further feature of the invention is the provision of such a valve structure having means for permitting adjustability of the valve structure on the catheter tube while yet maintaining communication therethrough to the lumen inlet opening.

Still another feature of the invention is the provision of such a valve structure having a new and improved penetrable valve element for removably receiving a tapered fluid flow duct such as a syringe needle.

A still further feature of the invention is the provision of such a valve structure having a new and improved cap means for precluding inadvertent opening thereof as by squeezing deformation of the valve structure.

A further feature of the invention is the provision of such a valve structure having new and improved means for seating the syringe needle during the air delivery operation.

A still further feature of the invention is the provision of such a valve structure having a new and improved penetrable valve member.

Another feature of the invention is the provision in a tubular conduit having an end portion, a lumen extending longitudinally in the wall of the conduit, and a radial opening in the end portion providing connection with the lumen, valve structure for controlling fluid flow into and from the lumen through the opening, the valve structure including a housing having an annular attachment portion encircling the end portion to overlie the opening, means for sealing the attachment portion about the end portion at axially opposite sides of the opening, and a connection portion extending outwardly from the attachment portion and defining a chamber communicating with the lumen opening through the attachment portion, the connection portion having valve means for accepting the end of a fluid flow duct for transferring fluid through the housing to and from the lumen.

Other features and advantages of the invention will be apparent from the following description taken in connection with the accompanying drawing wherein:

FIG. 1 is a broken side elevation of a catheter having a valve structure embodying the invention. With a syringe needle illustrated fragmentarily in an air-introducing position, and with the balloon shown in dotted lines in an extended position;

FIG. 2 is an enlarged fragmentary diametric section thereof illustrating the valve structure as mounted on the catheter tube;

FIG. 3 is a fragmentary vertical section taken substantially along the line 3—3 of FIG. 2; and FIG. 4 is a transverse section taken substantially along the line 4—4 of FIG. 2.

In the exemplary embodiment of the invention as disclosed in the drawing, a valve structure generally designated 10 is mounted on the outer end 11 of a tubular conduit 12. More specifically, herein the tubular conduit comprises a catheter tube having an inflation lumen 13 extending longitudinally of the tube in the wall thereof and provided with an inlet opening 14 in the outer end 11 of the tube 12 and an outlet opening 15 in the inner end 16 of the tube. A balloon 17 is sealingly, annularly secured to the tube at opposite sides of the opening 15 so that when air is delivered through the lumen 13 and outwardly through the opening 15, the balloon is distended, as shown in dotted lines in FIG. 1. The catheter tube further includes an axial bore 18 having an axial outer opening 19 and a radial inner opening 20 for conducting fluids, such as body fluids, outwardly through the catheter. In such operation, the balloon 17 is distended to retain the inner end 16 of the catheter in the body cavity against accidental withdrawal therefrom.

Referring more specifically to FIGS. 2 through 4, the valve structure 10 is shown to comprise a Y-shaped adapter including a housing 21 having an annular attachment portion 22 adapted to be mounted on the catheter end 11 and a connection portion 23 for receiving the tapered end 24 of a fluid flow duct, such as a syringe needle. When the needle end 24 is inserted into the connection portion 23, fluids such as air may be pumped therethrough and inwardly through the inlet opening 14 of the lumen 13 for flow through the lumen into the balloon 17.

In the illustrated embodiment, the catheter end 11 is frustoconical and the lumen opening 14 is elongated parallel to the axis of the end 11 to provide a relatively large size inlet opening, as shown in FIG. 3.

The catheter tube 12 may be formed of a resilient plastic. The attachment portion 22 of the valve housing 21 includes an inturned outer flange 25 and an inturned inner flange 26 having corresponding frustoconical inner surfaces 25a and 26a, respectively, adapted to sealingly engage the frustoconical catheter end 11, as shown in FIG. 2. The valve housing 21 may be formed of plastic, and the sealing engagement between the catheter end 11 and the flanges 25 and 26 may be augmented by solvent bonding thereof. The spacing between flanges 25 and 26 is preferably substantially greater than the longitudinal extent of the lumen opening 14 so that the attachment portion 22 may be axially variably positioned on the frustoconical catheter end 11, while yet the lumen inlet opening 14 is disposed therebetween. As shown in FIGS. 2 and 3, the internal diameter of attachment portion 22 is slightly larger than the external diameter of the catheter end adjacent lumen opening 14, thereby defining an annular space 27 therebetween.

The connection portion 23 of the valve housing 21 is provided with an axial bore 28 communicating at its inner end with the space 27 and opening outwardly through an outer end 29 of the attachment portion. Outer end 29 is externally stepped to define a first, outer frustoconical recess 30 and a second, inner frustoconical recess 31 having an inside diameter equal to the outside diameter of recess 30. The bore 28 may be enlarged at the outer end as at 28a. As shown in FIG. 2, the connection portion 23 extends at an angle to the axis of attachment portion 22 and herein extends at an angle approximately 45° thereto.

A cup-shaped valve member 32 is mounted on the outer end 29 of the connection portion 23, and includes an annular sidewall 33 snugly received in the outer recess 30. The valve member 32 may be formed of a resilient material such as rubber, and is provided with an inwardly dished midportion 34 having a transverse slit 35 therein, as shown in FIG. 4, extending in the illustrated embodiment approximately 0.06 inches. The slit 35 is adapted to accept the end 24 of the syringe needle which, as shown in FIG. 2, effects an opening of the slit to the dotted line position.

The valve member 32 is effectively retained on the outer end 29 of the connection portion 23 by a rigid plastic cap 36 having an annular sidewall 37 received in the recess 31 and overlying the annular wall 33 of the valve member received in the recess 30. The outer transverse wall 38 of the cap is provided with an axial opening 39 through which the needle end 24 is inserted, to pass through the slit 35 and into the connection portion bore 28. When the needle end 24 is inserted fully into the bore 28, the needle is supported by the outer wall 38 in the opening 39 as shown in FIG. 2. The outer wall may be provided with an annular rib 40 engaging the valve member 32 outwardly of the housing end portion 29 for improved retention of the valve member on the housing. The valve member 32 may be solvent bonded to the housing end portion 29 in recess 31 to secure the assembly of the valve member and cap on the housing.

The operation of the valve structure 10, as briefly indicated above, is extremely simple. With the valve force-fitting on the end 11 of the catheter in communication with the lumen opening 14, air may be delivered through the lumen by a pumping action effected by a conventional hypodermic syringe (not shown). Thus, the needle end 24 of the syringe may be passed through the slit 35 into the connection portion 23, and the syringe manipulated to pump air through the needle end 24 into bore 28 and thence through the lumen 13 into the balloon 17.

Where more than one pumping stroke of the syringe is necessary to effect the desired distention of the balloon 17, upon completion of the first stroke, the user withdraws the needle end 24 outwardly through the valve member 32. The valve slit 35 automatically closes upon the withdrawal of the needle by virtue of the resilient biasing of the slit to the closed position. The user then suitably arranges the syringe for a subsequent pumping stroke and reinserts the needle end 24 through the slit 35 to effect a second such pumped delivery of air through the inflation lumen 13 into balloon 17.

The rigidity of the cap 36 provides improved protection against accidental deflation of the balloon as by inadvertent squeezing deformation of the valve member 32. Thus, when the balloon 17 is sufficiently distended, the pumping operation is discontinued and the needle end 24 withdrawn, whereupon valve member 32 effectively maintains the air pressure in the balloon until released by the user as by inserting an open syringe needle therethrough.

While we have shown and described one embodiment of my invention, it is to be understood that it is capable of many modifications. Changes, therefore, in the construction and arrangement may be made without departing from the spirit and scope of the invention as defined in the appended claims.

We claim:

1. In a tubular catheter having an end portion, a lumen extending longitudinally in the wall of the catheter, and a radial opening in said end portion providing communication with said lumen, valve structure for controlling fluid flow into and from said lumen through said opening, said valve structure comprising: a housing having an arcuate attachment portion means for sealing said arcuate attachment portion to said end portion about said opening; a connection portion extending outwardly from said attachment portion and defining a passage communicating with said lumen opening through said attachment portion, said connection portion having valve means for accepting the end of a fluid flow duct for transferring fluid through said housing to and from said lumen, said valve means comprising a resilient, inwardly dished wall having a slit in an inner portion thereof biased to a closed condition for yieldingly passing said flow duct end therethrough; and means engaging said valve means for controlling the configuration thereof to effectively maintain said slit in the closed condition other than when a fluid flow duct end is inserted thereinto.

2. The tubular catheter structure of claim 1 wherein said attachment portion is annular and said sealing means includes means bonding said attachment portion of the housing to said conduit end portion.

3. The tubular catheter structure of claim 1 further including a relatively rigid cap mounted on said connection portion and having an opening therethrough in registry with said valve means slit for receiving and supporting a fluid flow duct end passed therethrough.

4. The tubular catheter structure of claim 1 wherein said catheter includes a second, inflation lumen.

5. The tubular catheter structure of claim 1 wherein said means for controlling the configuration of the valve means comprises an annular element disposed concentrically of said valve means.

6. The tubular catheter structure of claim 1 wherein said valve means comprises a slit wall member and said means for controlling the configuration of the valid means includes annular means engaging one end of said wall member.

7. The tubular catheter structure of claim 1 wherein said valve means comprises a slit wall member and said means for controlling the configuration of the valve means includes annular means encircling said wall member.

PO-1050
(5/69)

UNITED STATES PATENT OFFICE
CERTIFICATE OF CORRECTION

Patent No. 3,577,992            Dated May 11, 1971

Inventor(s) Jack D. Merry and Fritz Deuschle

It is certified that error appears in the above-identified patent and that said Letters Patent are hereby corrected as shown below:

Please change the Assignee from "Brunswick Corporation" to --Sherwood Medical Industries, Inc.--

Signed and sealed this 2nd day of November 1971.

(SEAL)
Attest:

EDWARD M. FLETCHER, JR.      ROBERT GOTTSCHALK
Attesting Officer               Acting Commissioner of Patents